Figure 1:
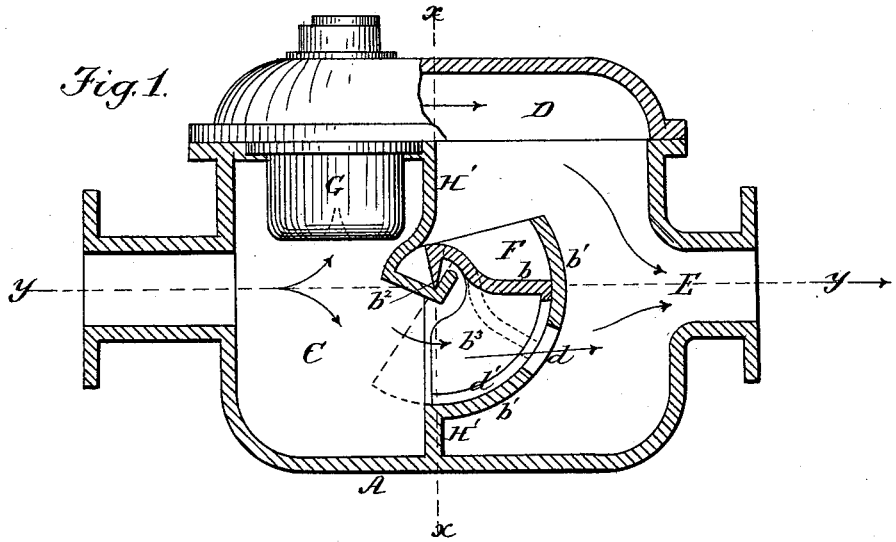

(No Model.)

L. H. NASH.
PROPORTIONAL WATER METER.

No. 336,137. Patented Feb. 16, 1886.

Witnesses:
R. E. Grant
G. E. Tucker

Inventor:
Lewis H. Nash
by Johnson and Johnson
Attys.

N. PETERS, Photo-Lithographer, Washington, D. C.

UNITED STATES PATENT OFFICE.

LEWIS HALLOCK NASH, OF BROOKLYN, ASSIGNOR TO THE NATIONAL METER COMPANY, OF NEW YORK, N. Y.

PROPORTIONAL WATER-METER.

SPECIFICATION forming part of Letters Patent No. 336,137, dated February 16, 1886.

Application filed June 22, 1885. Serial No. 169,391. (No model.)

*To all whom it may concern:*

Be it known that I, LEWIS HALLOCK NASH, a citizen of the United States, residing at Brooklyn, in the county of Kings and State of New York, have invented new and useful Improvements in Proportional Water-Meters, of which the following is a specification.

The meter is constructed to divide the influent volume into two streams, one of which only is measured, so as to represent a given and definite proportion of the entire volume.

In other applications for patents filed by me of even date herewith, I have described and claimed an organized meter device for carrying out a method of effecting a proportional measurement of a volume divided into separate streams, whereby a great or small capacity of supply is obtained by utilizing the operation of a valve having a port formed to control the discharge from the non-metered chamber in such manner that it will always bear a fixed proportion to the quantity passing through the metered passage, so that the indicator will give the sum-total of the entire passing volume under different rates of flow. In this action the principle involved is controlling the discharge from the non-metered passage, so that it shall always bear a fixed proportion to the quantity passing through the metered passage, so as to allow of the flow through the valve-controlled ports in just the required quantity under the different rates of flow, governed under all conditions by the pressure in the two chambers on opposite sides of the valve. To accomplish this I employ in my hereinbefore-referred-to applications what I have termed a "piston-valve," having ports of irregular form operating in connection with discharge-ports of regular form, and also in connection with provision for causing the valve to have an increasing resistance to its movement under the pressure of the water in the receiving-chamber, in order to balance the difference in pressure between the influent and effluent passages as the valve moves under this pressure.

The object of my present improvement is to obtain the same result and operation by a swinging valve, which offers more and more resistance to the pressure of the water as it swings farther from the perpendicular, and which at the same time, by its port, operates to allow just the required quantity of water to pass the discharge-port. In this plan the swinging valve acts like a pendulum to increase or diminish its resistance to its movement, and therefore in itself forms a weight which increases in proportion as it is moved by the pressure of the water from a vertical to a horizontal position to cause its port to operate with the discharge-port, as I have stated.

This improvement I will now describe in connection with the accompanying drawings, in which—

Figure 3:
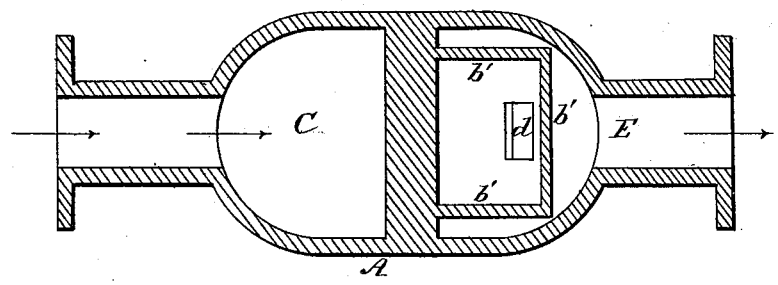
Figure 4:
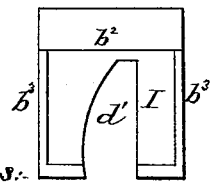
Figure 2:
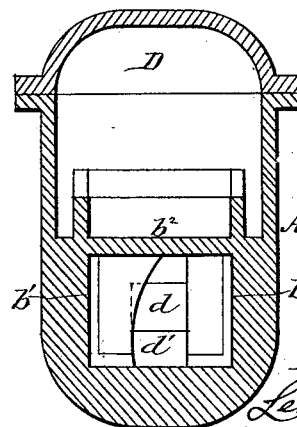

Figure 1 represents a vertical section of a proportional water-meter, showing the indicating device in elevation; Fig. 2, a vertical section of the same on line $x$ $x$ of Fig. 1; Fig. 3, a horizontal section of the same on the line $y$ $y$, the valve being removed; and Fig. 4, the swinging valve.

A is the inclosing-case, divided into a receiving-chamber, C, which I term the "non-metered" passage, a chamber, D, which I term the "metered" passage, and a discharge-chamber, E, which communicates with the chambers C and D. Within the chamber-forming partition H' is placed the meter G, which I have shown in elevation as suspended within the receiving-chamber, and which contains the devices for operating the indicator or dial mechanism. Through this meter a portion of the influent volume passes into the chamber D and is measured. Within this partition H' is also placed the swinging valve for controlling the discharge from the non-metered chamber. The valve-seat F is formed in a segmental case-port, $b'$, of the chamber-forming partition, and opens, respectively, at its top into the chamber D, and at its bottom into the receiving-chamber C, so that the pressure in both chambers will be exerted on opposite sides of the valve, which operates in the case-port like a pendulum.

The valve-seat has a port, $d$, of regular form, through which the water passes from the receiving into the discharging chamber E, as indicated by the arrows. The valve I is of segmental form, has its seat within the segmental case-port of the partition, and has a long port, $d'$, of irregular form, which regulates the discharge-port $d$ in said seat. A radial part, $b$, forms the closed end of the valve by crossing the seat-casing, and upon this part $b$ the valve is suspended at its center by a knife-edge bearing, $b^2$, upon which it is free to swing in its seat. The fixed point of suspension in the seat-case is like a trough, and forms the center of the arc described in the movement of the valve, while the radial part $b$ of the valve receives the action of the pressure of the water on its opposite sides to operate its port. Side walls, $b^3$, of the valve extend from its segmental port-face inward to form a joint with the inclosing-case walls $b'$, so that the only escape for water is through the port-opening $d$, so that the water flowing through the chambers will act by pressure upon the closed end of the valve in a manner to cause it to rise and fall by the difference in the pressure of the two flowing streams, and thereby operate its port in connection with the discharge-port. In this operation the leverage of the valve serves as a weight to increase resistance to its movement as it rises under the pressure of the water in the receiving-chamber, in order to balance the difference in pressure between the influent and the effluent passages as the valve moves under this pressure.

Now, with a valve operating with a variable resistance it is necessary, in order to control the flow of the water through the receiving-chamber, to provide an operating valve-port which shall make the proper size of opening to allow just the required quantity of water to pass from said chamber. Under very small rates of flow a larger proportion of water will pass through a given-sized port from the receiving chamber than will pass with a larger flow, and hence this port should be closed by the valve to an extent just sufficient to allow of the passage of the required proportion of water. Under high rates of flow the resistance through the metered passage will be of greater proportion than the flow through the receiving-chamber, and hence the valve should be capable of slightly closing the port $d$ at the higher rates of flow over the size of port required at the medium rates of flow. It is for this purpose that I form the long valve-port $d'$ of an irregular form, being of less area at its upper than at its lower end, so that when the valve is in a lower position, as seen in Figs. 1 and 2, the edge or edges of its port at its upper end will overlap the edge or edges of the port $d$, so as to close the latter to some extent. As the valve rises, its port $d$ widens, so as to increase the discharge-opening until the valve approaches its extreme upper limit, when the discharge-opening will again become smaller, for the purpose above stated.

As the quantity of water discharged by the valve will be a multiple of the volume passing through the metered passage, it is obvious that variations in the flow through the metered passage will be caused by a certain difference of pressure between the receiving-chamber and the outlet-chamber, and it is therefore necessary to provide for balancing this difference of pressure to obtain in the two streams an unchanging proportion to each other under all conditions of flow, it being understood that the exact shape of the valve-ports must be determined by actual test for meters of different capacities.

When there is little or no pressure in the chamber C, the valve will hang in the position shown in dotted lines; but as the pressure acts upon the valve it will move up in the position shown in full lines, and the greater the pressure becomes in said chamber the farther the swinging valve will move out from said chamber.

I may use any suitable meter device, G, and arrange it in any suitable way to receive and measure a part of the volume flowing through the chamber C.

The method which I have herein described of measuring a flowing volume divided into two separate streams, so that they shall bear an unchanging relation to each other under all conditions of the flow in the measurement of one of said streams and in controlling the discharge of the other, is not claimed herein, as such invention is made the subject of a separate application for a patent filed by me of even date herewith. The wall-port may have the irregular form and the valve-port the regular form.

I claim—

1. The combination, in a water-measuring device, of an inclosing-case having chambers dividing the influent volume into separate streams, and an indicating device operated by the direct flow of one of said streams to effect its measurement, with a swinging valve having a port, and arranged to control the discharge of the other stream, whereby the two streams are caused to bear an unchanging proportion to each other under all conditions or different rates of flow.

2. The combination, in a water-measuring device having separate chambers receiving the inflow in separate streams and discharging it in a single volume, of the meter G, containing the indicating operating parts for measuring one of said streams, with a valve hung upon a knife-edge bearing dividing said chambers, and having a port formed and arranged to regulate the discharge-port to control the discharge of the other stream, substantially as described, for the purpose specified.

3. The combination, in a water-meter, the indicating parts of which are operated by a division of the volume to be measured, of an inclosing-case having chambers receiving the inflow in separate streams, divided by a partition having a segmental valve-seat, F, provided with a discharge-port, $d$, of regular form, with a segmental valve having a port, $d'$, of irregular form in its segmental part, hung within said segmental valve-seat to operate the discharge-port, substantially as described, for the purpose described.

4. The combination of the case having an interior segmental valve-seat in the division thereof, open at both ends, having a port, $d$, communicating with the receiving and discharging chambers, with a segmental valve, F, having the port $d'$, the radial closed end $b$, the knife-edge bearing $b^2$, and the side walls, $b^3$, substantially as described, for the purpose specified.

In testimony whereof I have hereunto set my hand in the presence of two subscribing witnesses.

LEWIS HALLOCK NASH.

Witnesses:
A. E. H. JOHNSON,
J. W. HAMILTON JOHNSON.